(12) United States Patent
Barrett et al.

(10) Patent No.: US 6,239,880 B1
(45) Date of Patent: May 29, 2001

(54) MEMORY MANAGEMENT SYSTEM FOR A PRINTING SYSTEM

(75) Inventors: Michael W. Barrett, Fairport; Andrew T. Martin, Webster; Christie A. May, Macedon; Andrea L. Carpenter, Webster; Anne E. Dewitte, Fairport, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/058,493

(22) Filed: Apr. 10, 1998

(51) Int. Cl.$^7$ ..................................................... B41B 6/00
(52) U.S. Cl. .................. 358/1.16; 358/1.15; 358/1.17; 358/1.18; 399/82; 347/129; 371/256
(58) Field of Search ................................. 358/1.15, 1.16, 358/1.17, 1.18; 399/82; 371/256; 347/129

(56) References Cited

U.S. PATENT DOCUMENTS

| | | | |
|---|---|---|---|
| 5,081,494 | * 1/1994 | Reed et al. | 355/202 |
| 5,260,805 | 11/1993 | Barrett | 358/449 |
| 5,271,065 | 12/1993 | Rourke et al. | 382/1 |
| 5,371,837 | * 12/1994 | Kimber et al. | 358/1.15 |
| 5,535,312 | 7/1996 | Hammer et al. | 395/115 |
| 5,579,087 | 11/1996 | Salgado | 355/202 |

* cited by examiner

Primary Examiner—Edward Coles
Assistant Examiner—Twyler Lamb
(74) Attorney, Agent, or Firm—Gary B. Cohen; Richard F. Spooner

(57) ABSTRACT

A method for processing a job, including image data and a set of attributes, in a document processing system is provided. Each attribute is corresponded with either a default value or a user set value. The document processing system further includes a user interface at which a set of default values are settable, in response to user input, to create a set of user set values, and a memory for storing at least a part of the image data of the job wherein the at least part of the image data of the job is less than all of the image data of the job. The method includes: (a) storing the at least part of the image data in the memory; (b) in response to user input, respectively changing one or more values of the set of user set values to one or more values of the set of default values; and (c) in response to the changing in (b), deleting the at least part of the image data in the memory when a selected condition is met.

7 Claims, 12 Drawing Sheets

MEMORY MANAGEMENT SYSTEM FOR A PRINTING SYSTEM

Cross reference is made to U.S. patent application Ser. No. 08/058,950 (Attorney Docket Number 97569) entitled "System for Altering Attribute Values in a Printing System", filed on Apr. 10, 1998 by Barrett et al.

BACKGROUND

This invention relates generally to a user interface of a printing system and more particularly to an attribute value clearing system in which a user is prompted to delete image data whenever the user seeks to clear attribute values before a data storage threshold has been achieved.

In the area of digital copying, there is a growth in demand for what is commonly referred to as "multifunctionality". As illustrated by U.S. Pat. No. 3,957,071 to Jones, a multifunctional digital copier can assume the form of an arrangement in which a single print engine (e.g. xerographic or thermal ink jet print engine) is coupled with a plurality of different image input devices (or "services"), with such devices being adapted to produce image related information for use by the printer. The '071 Patent discloses that the image related information, in one example, could have its origin in video facsimile signals, microfilm, data processing information, light scanning platens for full size documents, aperture cards and microfiche. The following patents also relate to the area of multifunctional digital copying: U.S. Pat. Nos. 4,821,107 to Naito et al.; 5,021,892 to Kata et al.; 5,175,633 to Saito et al.; 5,223,948 Sakurai et al.; 5,276,799 to Rivshin; 5,307,458 to Freiburg et al.

One of the advantages to a multifunctional copier resides in the capability to program a job relative to multiple services so that, as disclosed by U.S. Pat. No. 5,301,262 to Salgado et al., a distribution job including one or more job segments can be developed. As disclosed by the '262 Patent, each job segment is programmed with a job ticket to define suitable inputs and outputs required to implement the job. In one example, a user can program a job with both a copy segment and a fax segment so that one document copy is provided at the output of a host multifunctional printing machine and another document copy is facsimile transmitted remotely of the host multifunctional printing machine. As is known, programming of each job segment is preferably achieved with one or more programmable dialogs, each of which is referred to as a "job ticket. Each programmable dialog includes values which are selected with a user interface, such as the user interface provided with the DocuTech Production Publisher (Model 135) ("DocuTech" is a registered trademark of Xerox Corporation). Job tickets can vary dramatically in both structure and functionality. In one instance, the job ticket may assume the form of a relatively simple dialog displayed on a liquid crystal display ("LCD"). Attributes of a corresponding job, such as desired image processing, designated stock and finishing characteristics may be displayed for setting of suitable output values, e.g., stock size.

Since the programming for a job can be relatively complex, it is often desirable to provide a plurality of job tickets, corresponding with a plurality of frames. In practice, each dialog relates to the programming of a set of job attributes, such as stock characteristics.

U.S. Pat. No. 5,079,723 to Herceg et al. discloses a touch dialog user interface for programming a reproduction machine through use of a touch control CRT screen with a display for providing a message area, user interface state selections, and plural tapped file folders. Each file folder, when opened, in turn, displays a smaller card file of tabbed cards with an adjacent work area. Each card in the card file, when opened, provides a display of icons representing first level machine programming selections for touch selection. Each icon, when touched, displays further icons representing second level programming selections in the work area for touch selection.

Some of the basic concepts of U.S. Pat. No. 5,079,723 have been incorporated in U.S. Pat. No. 5,260,805 to Barrett in which an electronic printing system with a touch screen for programming print jobs using job tickets displayed on the screen is provided. In U.S. Pat. No. 5,260,805, the job tickets have various job programming choices together with scaled representations of a print image superimposed on selected print media, and a control for comparing the size of the print image, as originally oriented with a maximum image size. A full message is displayed on the screen, in the event that the print image size exceeds the system maximum image size, even though the print image as displayed fits into the print media.

U.S. Pat. No. 5,271,065 to Rourke et al. discloses a technique for printing a signature job, i.e., a job resulting in a plurality of sheets being imaged on signature print media sheets, in a selected order for creating a booklet. A plurality of job tickets are employed to program the signature job. In one aspect of the technique, lay-out work for the signatures to be produced is performed with a job ticket in which a gutter and margins are programmably set for each pair of electronic sheets on one side of an electronic signature sheet.

As can be appreciated from the above discussion, a given job can be associated with a plurality of job tickets and each of those tickets can include a set of attribute values specific to a particular user. At one time or another, the user may seek to "clear" these values. In a conventional "light-lens" copier, this clearing function may be performed automatically so that all programmable values are returned to a default condition. This same sort of clearing function is also available in the more advanced Docutech Production Publisher.

In the DocuTech Production Publisher, however, enablement of the Clear button, which is provided with a job programming screen is not believed to clear all of the screens associated with a given job, but rather those screens associated specifically with the programming values of the job. Thus certain other dialogs, such as dialogs associated with job or machine status are not cleared by selection of the Clear button. It would be disadvantageous to provide a multifunctional printing system possessing a user interface that is incapable of being cleared readily at multiple levels. At the same time it would be undesirable to clear all of the dialogs without suitable input or confirmation from the user. It would thus be desirable to provide a Clear button for a multifunctional printing machine user interface in which all dialogs associated with a given job are cleared subject to suitable user input.

As is known, multifunctional printing machines can be advantageously used for processing a job by electronically percolating job portions in a page buffer. In one example, a job portion is stored in the page buffer for the sake of performing a "Simplex-to-Duplex" or "Duplex-to-Duplex" operation. An example of arranging electronic pages in a system memory for the sake of performing such operations is disclosed by U.S. Pat. No. 5,535,312 to Hammer et al.

In another example, multiple job portions can be provided to the multifunctional printing machine for creating a supplement or "build" job. The job supplement approach of U.S. Pat. No. 5,081,494 is described in U.S. Pat. No. 5,243,381 to Hube as follows, > In practice, the job supplement is used to supplement a job as it is being scanned into the printing system. That is, when the job supplement mode is engaged, any number of additional documents or groups of documents may be scanned in with the job being scanned. Upon supplementing the job at the scanner, an END JOB icon is selected, and the supplemented job is stored in a memory section of the printing system.

The concept of job supplementation has been extended to the network environment through U.S. Pat. No. 5,579,087 to Salgado in that job segments (referred to herein as "job portions") can be delivered to a subject printer, from different locations on a network, for the sake of compiling the supplemented job.

It is understood that circumstances arise where a user stores one or more job portions in the page buffer and decides not to produce output from the stored corresponding image data. This can be particularly disadvantageous for a "walk-up" printing machine since the user may simply walk away from the job in process and fail to delete the stored image data. In turn, when the next user seeks to clear settings, he or she may encounter additional, wasted prints at the front end of his or her output. It would be desirable to provide a clearing system that optionally "cleans out" the page buffer whenever a "clear all" control is enabled with one or more job portions still stored in the page buffer or system memory.

The disclosures of all of the above-referenced patents are incorporated herein by reference.

SUMMARY OF THE INVENTION

In accordance with the presently disclosed invention there is provided a method for use in a document processing system for processing a job including image data and a set of attributes, each of which attribute is corresponded with either a default value or a user set value. The document processing system further includes a user interface at which a set of default values are settable, in response to user input, to create a set of user set values and a memory for storing at least a part of the image data of the job—the at least part of the image data of the job is less than all of the image data of the job. The method, which facilitates control of the processing of the job, includes: (a) storing the at least part of the image data in the memory; (b) in response to user input, respectively changing one or more values of the set of user set values to one or more values of the set of default values; and (c) in response to said (b) deleting the at least part of the image data in the memory when a selected condition is met.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
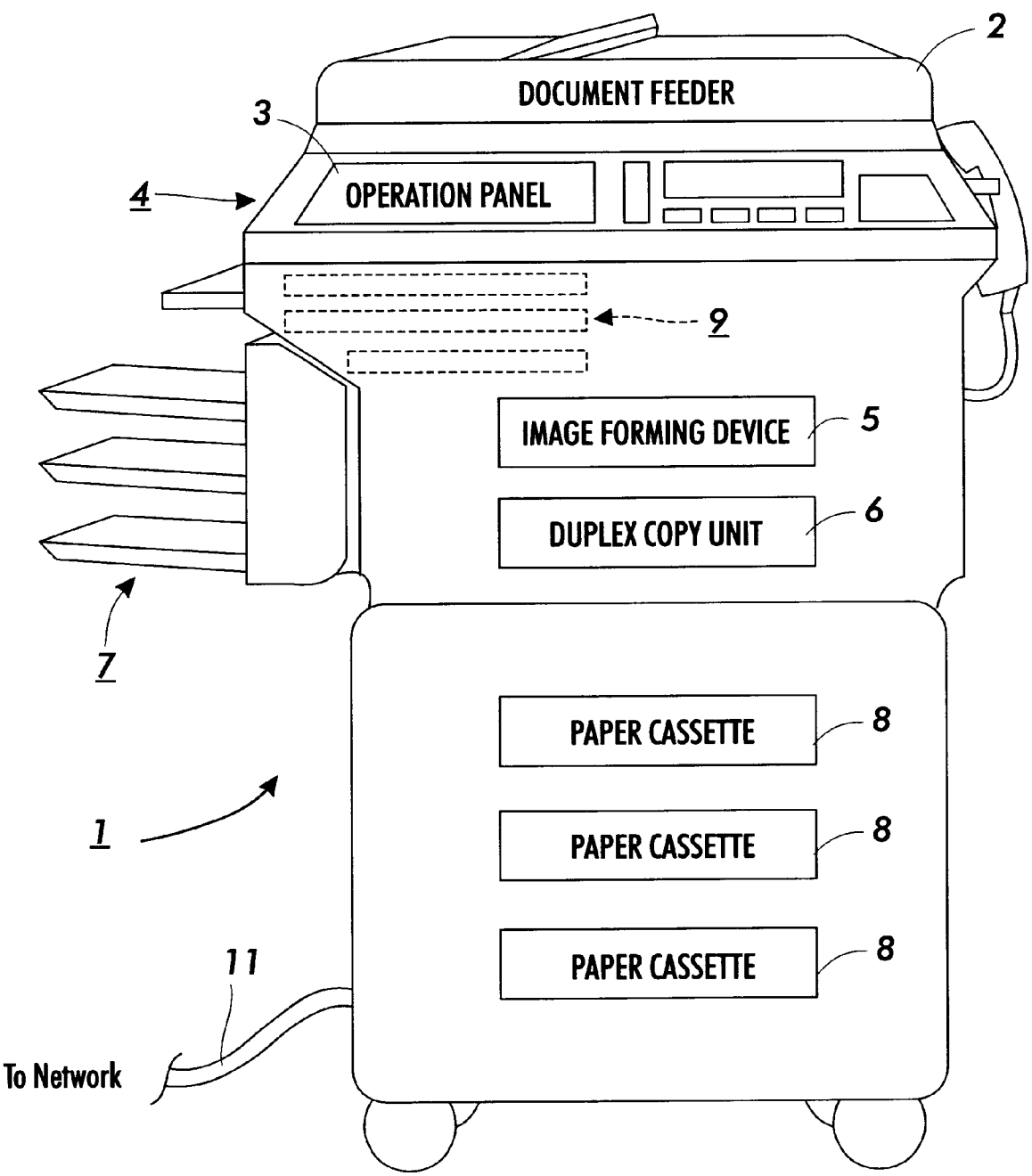
FIG. 1 a perspective view of a networked printing apparatus.

Referring to FIG. 1 of the drawings, a digital printing apparatus of the type suitable for use with the preferred embodiment is designated with the numeral 1. As shown, the system includes a document feeder 2 and an operation (and display) panel or user interface 3. After desired conditions have been entered on the operation panel 3, through the aid of a suitable display, the document feeder 2 conveys a document to a predetermined reading position on an image reading device 4 and, after the document has been read, drives it away from the reading position. The image reading device 4 illuminates the document brought to the reading position thereof. The resulting reflection from the document is transformed to a corresponding electric signal, or image signal, by a solid state imaging device, e.g., a CCD (Charge Coupled Device) image sensor. An image forming device 5 forms an image represented by the image signal on a plain paper or a thermosensitive paper by an electrophotographic, thermosensitive, heat transfer, ink jet or similar conventional system.

As a paper is fed from any one of paper cassettes 8 to the image forming device 5, the device 5 forms an image on one side of the paper. A duplex copy unit 6 is constructed to turn over the paper carrying the image on one side thereof and again feed it to the image forming device 5. As a result, an image is formed on the other side of the paper to complete a duplex copy. The duplex copy unit 6 has customarily been designed to refeed the paper immediately or to sequentially refeed a plurality of papers stacked one upon the other, from the bottom paper to the top paper. The papers, or duplex copies, driven out of the image forming device 5 are sequentially sorted by a output device 7 in order of page or page by page.

Applications, generally 9, share the document feeder 2, operation panel 3, image reading device 4, image forming device 5, duplex unit 6, output device 7, and paper cassettes 8 which are the resources built in the copier system. As will appear, the applications include a copier application, a printer (IOT) application, a facsimile (Fax) application and other applications. Additionally, the digital copier system is coupled with a network by way of a conventional network connection 11.

Figure 2:
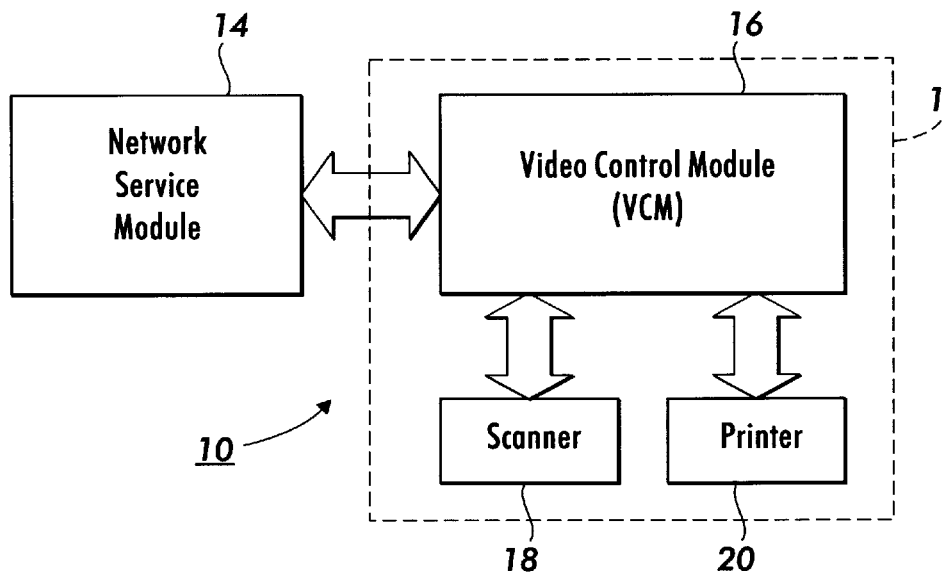
FIG. 2 is a block diagram depicting a multifunctional, network adaptive printing machine.

Referring to FIG. 2, a multifunctional, network adaptive printing system is designated by the numeral 10. The printing system 10 includes a printing machine 1 operatively coupled with a network service module 14. The printing machine 1 includes an electronic subsystem 16, referred to as a video control module (VCM), communicating with a scanner 18 and a printer 20. In one example, the VCM 16, which is described in detail in U.S. Pat. No. 5,579,447 to Salgado, the disclosure of which is incorporated herein by reference, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system (not shown), associated with the scanner 18, executes signal correction and the like, converts the corrected signals into multi-level signals (e.g. binary signals), compresses the multi-level signals and preferably stores the same in electronic precollation (not shown).

Referring still to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory, while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
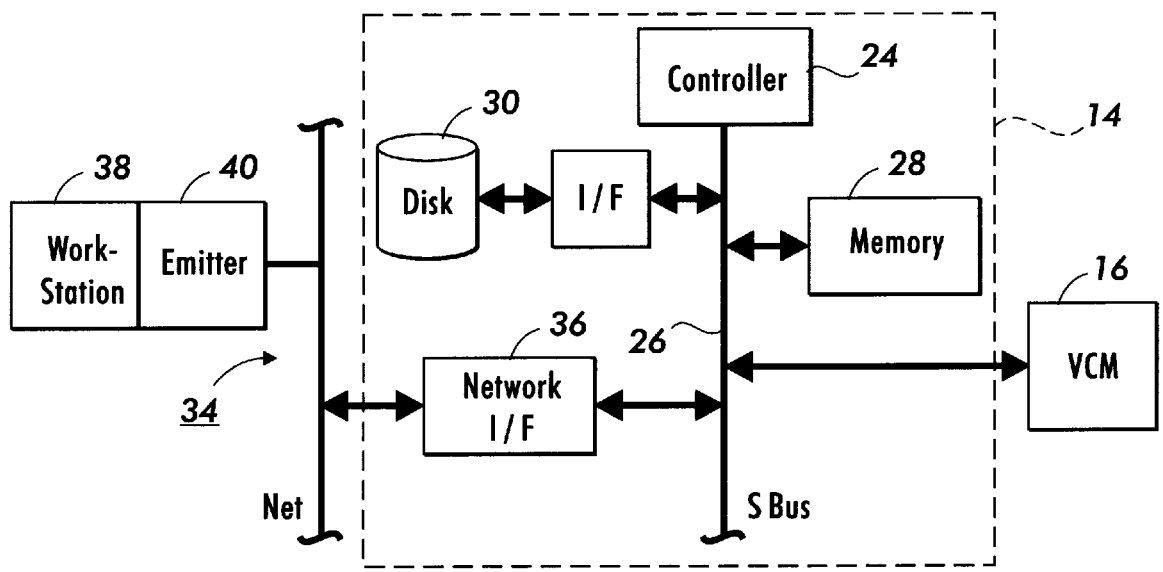
FIG. 3 is a block diagram of a network controller for the printing machine of FIG. 3.

Referring to FIG. 3, the network service module 14 is discussed in further detail. As will be recognized by those skilled in the art, the architecture of the network service module is similar to that of a known "PC clone". More particularly, in one example, a controller 24 assumes the form of a SPARC processor, manufactured by Sun Microsystems, Inc., is coupled with a standard SBus 26. In the illustrated embodiment of FIG. 3, a host memory 28, which preferably assumes the form of DRAM, and a SCSI disk drive device 30 are coupled operatively to the SBus 26. While not shown in FIG. 3, a storage or I/O device could be coupled with the SBus with a suitable interface chip. As further shown in FIG. 3, the SBus is coupled with a network 34 by way of an appropriate network interface 36. In one example, the network interface includes all of the hardware and software necessary to relate the hardware/software components of the controller 24 with the hardware/software components of the network 34. For instance, to interface various protocols between the network service module 14 and the network 34, the network interface could be provided with, among other software, Netware® from Novell Corp.

In one example, the network 34 includes a client, such as a workstation 38 with an emitter or driver 40. In operation, a user may generate a job including a plurality of electronic pages and a set of processing instructions. In turn, the job is converted, with the emitter, into a representation written in a page description language, such as PostScript. The job is then transmitted to the controller 24 where it is interpreted with a decomposer, such as one provided by Adobe Corporation. Some of the principles underlying the concept of interpreting a PDL job are provided in U.S. Pat. Nos. 5,493,634 to Bonk et al. and 5,226,112 to Mensing et al., the disclosures of both references being incorporated herein by reference. Further details regarding a technique for generating a job in a PDL may be obtained by reference to the following text, the pertinent portions of which are incorporated herein by reference:

PostScript® Language Reference Manual Second Edition Addison-Wesley Publishing Co. 1990

Further details regarding the implementation of a network capable printing system may be obtained by reference to U.S. Pat. No. 5,436,730 to Hube (Issued: Jul. 25, 1995), the disclosure of which is incorporated herein by reference.

Figure 4:
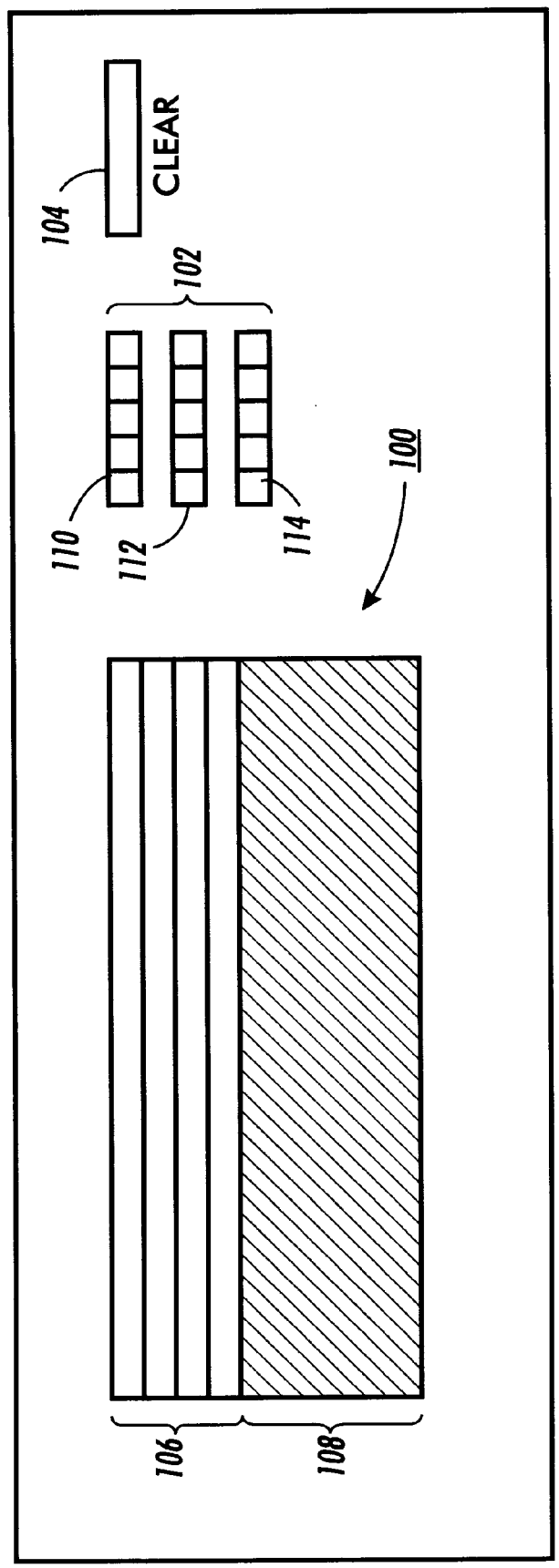
FIG. 4 is a schematic, detailed, elevational view of an operation panel shown in FIG. 1.

Referring now to FIG. 4, the operation panel shown in FIG. 1 is described in further detail. In particular, the operation panel includes a display area 100 and a set of pathway selection buttons 102. The operation panel further includes a clear button 104 which could be implemented as a "hard" button, as shown in the illustrated embodiment of FIG. 4, or as a "Soft" button disposed in the display area 100—further detailed description of the clear button 104 is provided below.

Figure 5:
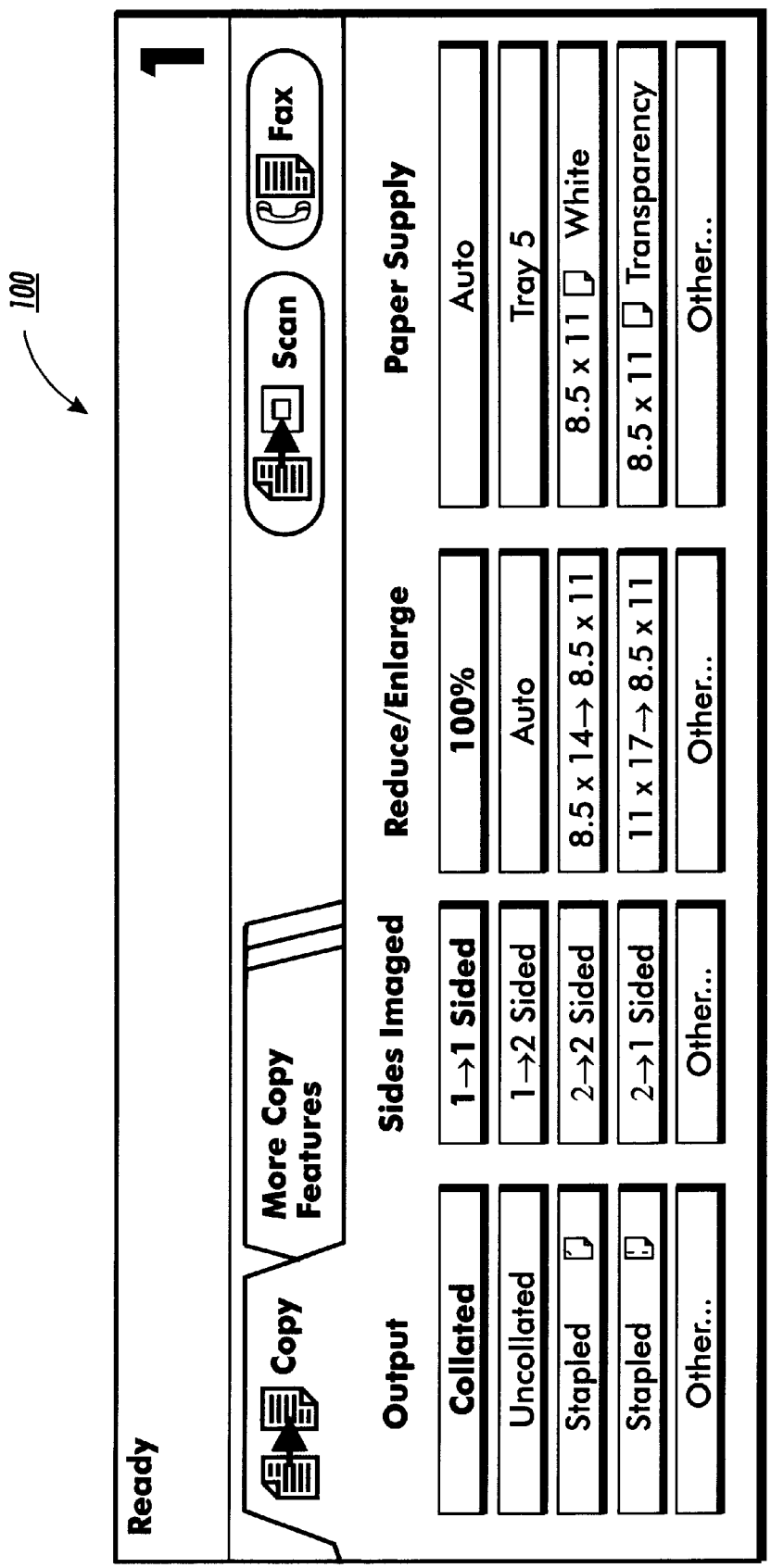
FIG. 5 is a partial, elevational view of the operation panel of FIG. 4 with a window for displaying a features pathway.

Referring to FIGS. 4–7, the display area 100 is divided into a message display area 106, including a plurality of lines (see e.g. the three lines of messages shown in FIG. 6), and a pathway display area 108. It should be recognized that a "pathway" is a set of information or settings corresponding with a particular aspect of system functionality. Preferably a first pathway is provided for "features", a second pathway for "job status" and a third pathway for "machine status". As illustrated in FIG. 5, the features pathway may relate to the attribute values associated with a given job segment or job type. In a typical multifunctional printing machine, job segments include "copy job", "print (local or network) job", fax (send and receive) job", "scan-to-file job", test job", and so on.

Figure 8:
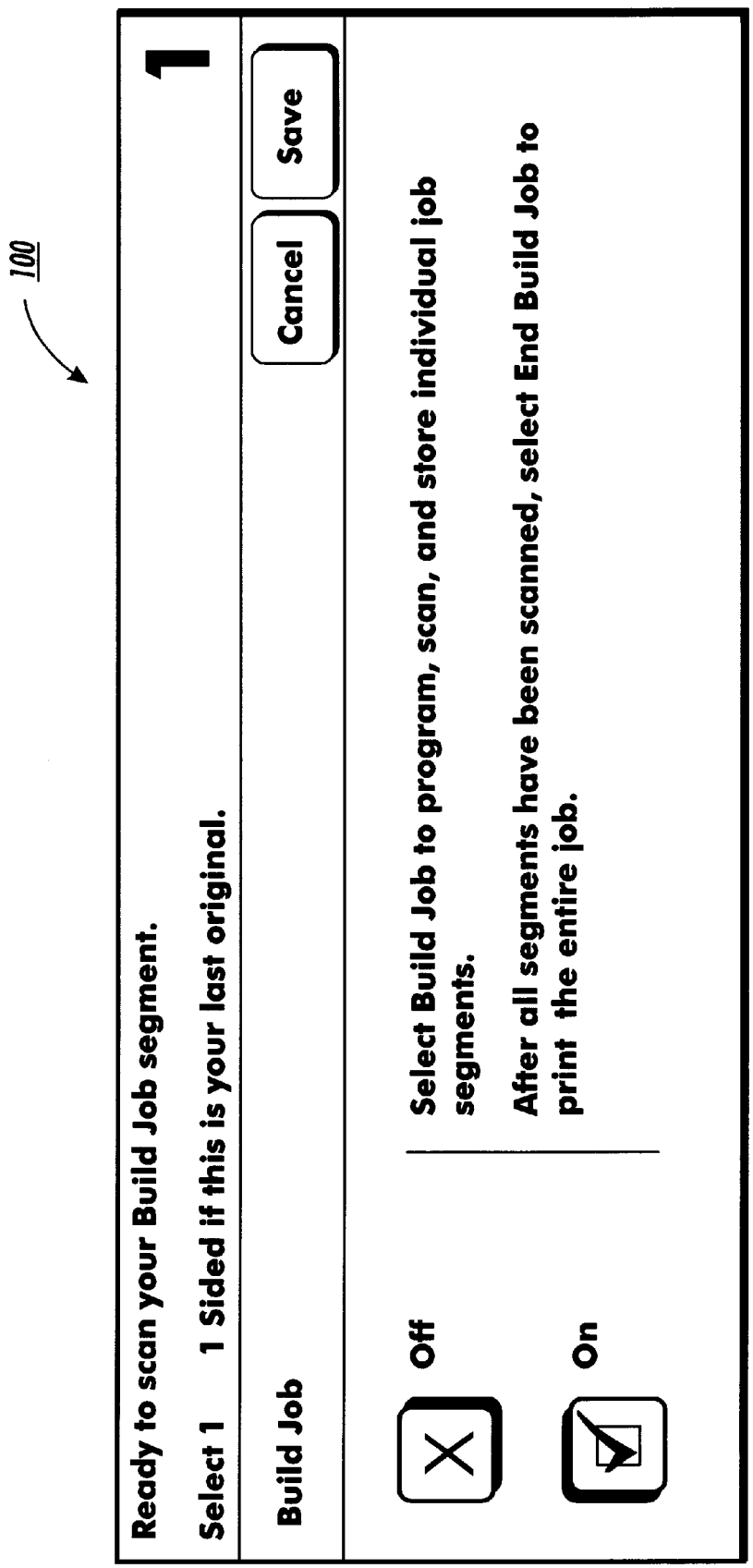
FIG. 8 is a partial, elevational view of the operation panel of FIG. 4 with a window for displaying a job assembly dialog.

It follows that attribute values particular to a job are settable through use of the features pathway and that a given job type is mapped to one or more dialogs stored in one of memories 28 and 30 (FIG. 3). In the example of FIG. 5, a dialog specific to setting Fax attribute values can be obtained by pressing or enabling the "Fax" button. Additionally, as shown in FIG. 8, a "build job" feature, the significance of which will be described in further detail below, is provided for combining multiple job portions into a single job.

Figure 6:
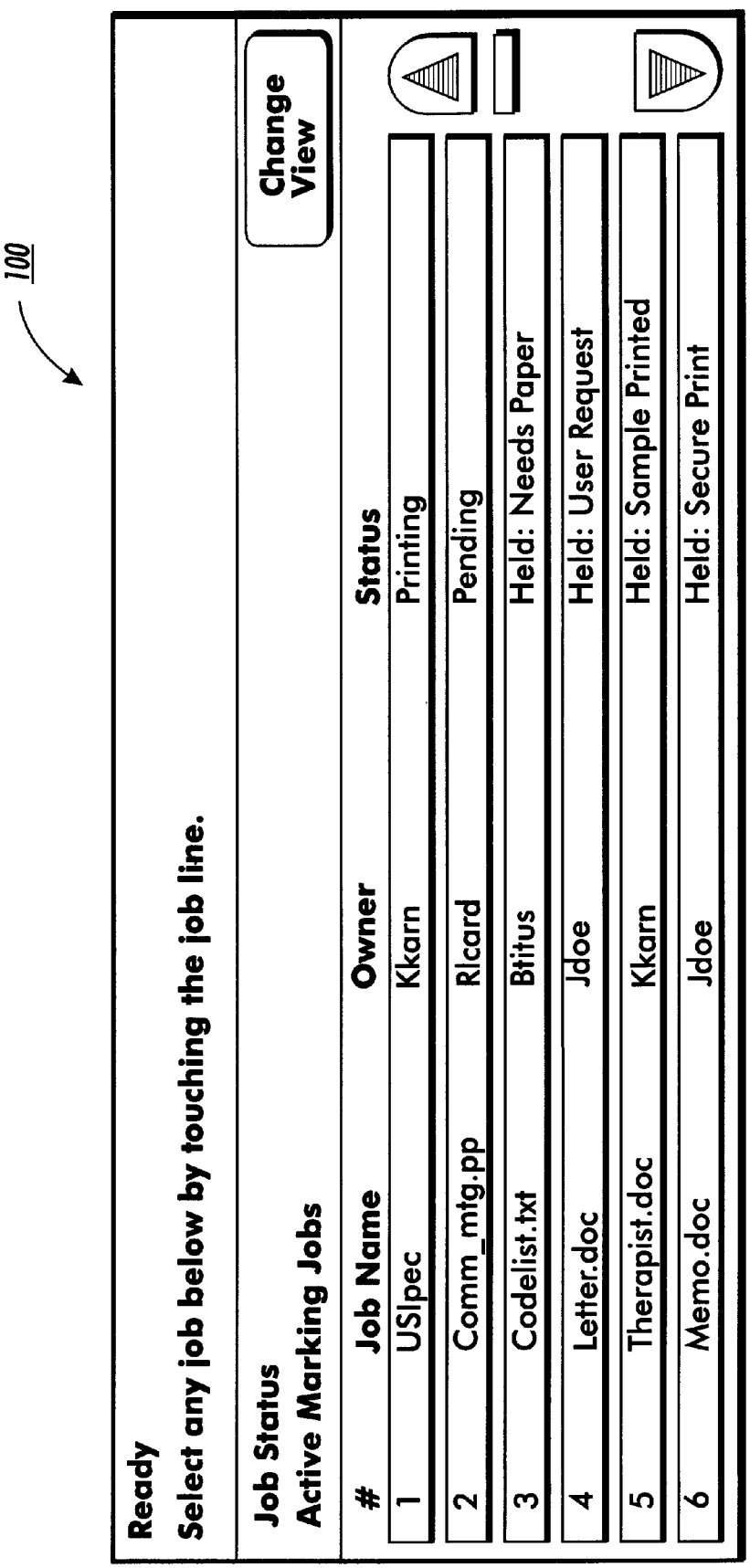
FIG. 6 is a partial, elevational view of the operation panel of FIG. 4 with a window for displaying a job status pathway.
Figure 7:
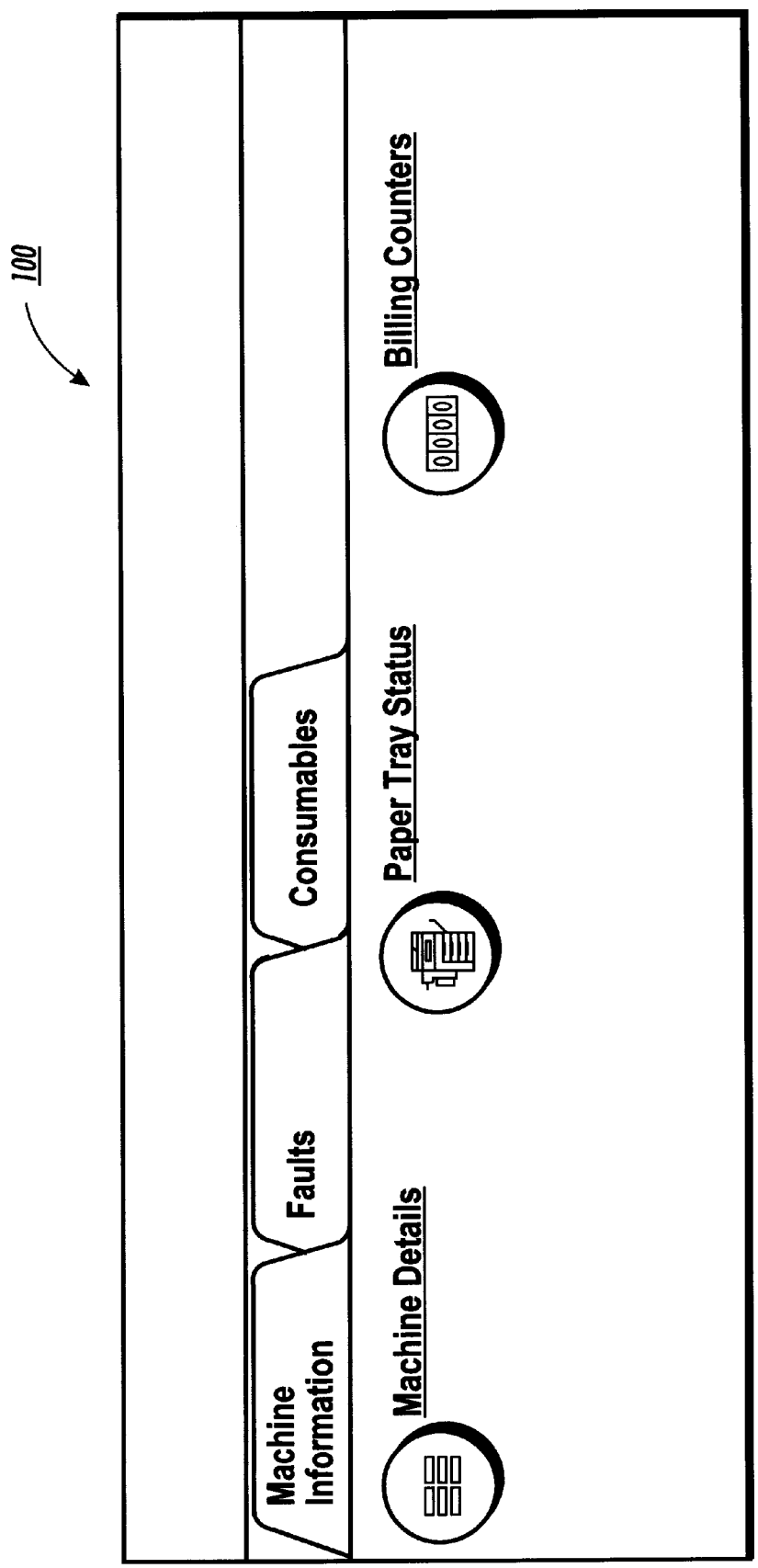
FIG. 7 is a partial, elevational view of the operation panel of FIG. 4 with a window for displaying a machine status pathway.

As illustrated in FIG. 6, the job status pathway relates to information or settings about jobs queued up within the system. Such information may relate to, among other things, "job name", "job type", "job owner", "current job status" and "priority". As shown in FIG. 6, the job status pathway permits a system user to track progress of a particular job through the system. As illustrated by FIG. 7, the machine status pathway relates to information about selected job processing subsystems, such as status information for paper cassettes 8 (FIG. 1). It will be appreciated that the machine status pathway would typically include multiple dialogs for controlling a host of machine functions. For instance developer material level can be assessed through use of a development related dialog (not shown).

In the illustrated embodiment of FIG. 4, selected information of a given pathway is displayed by pressing one of the buttons 110, 112 and 114. In particular, button 110 is pressed to display a dialog in the features pathway, button 112 is pressed to display a dialog in the job status pathway, and button 114 is pressed to display a dialog in machine status pathway.

Figure 9:
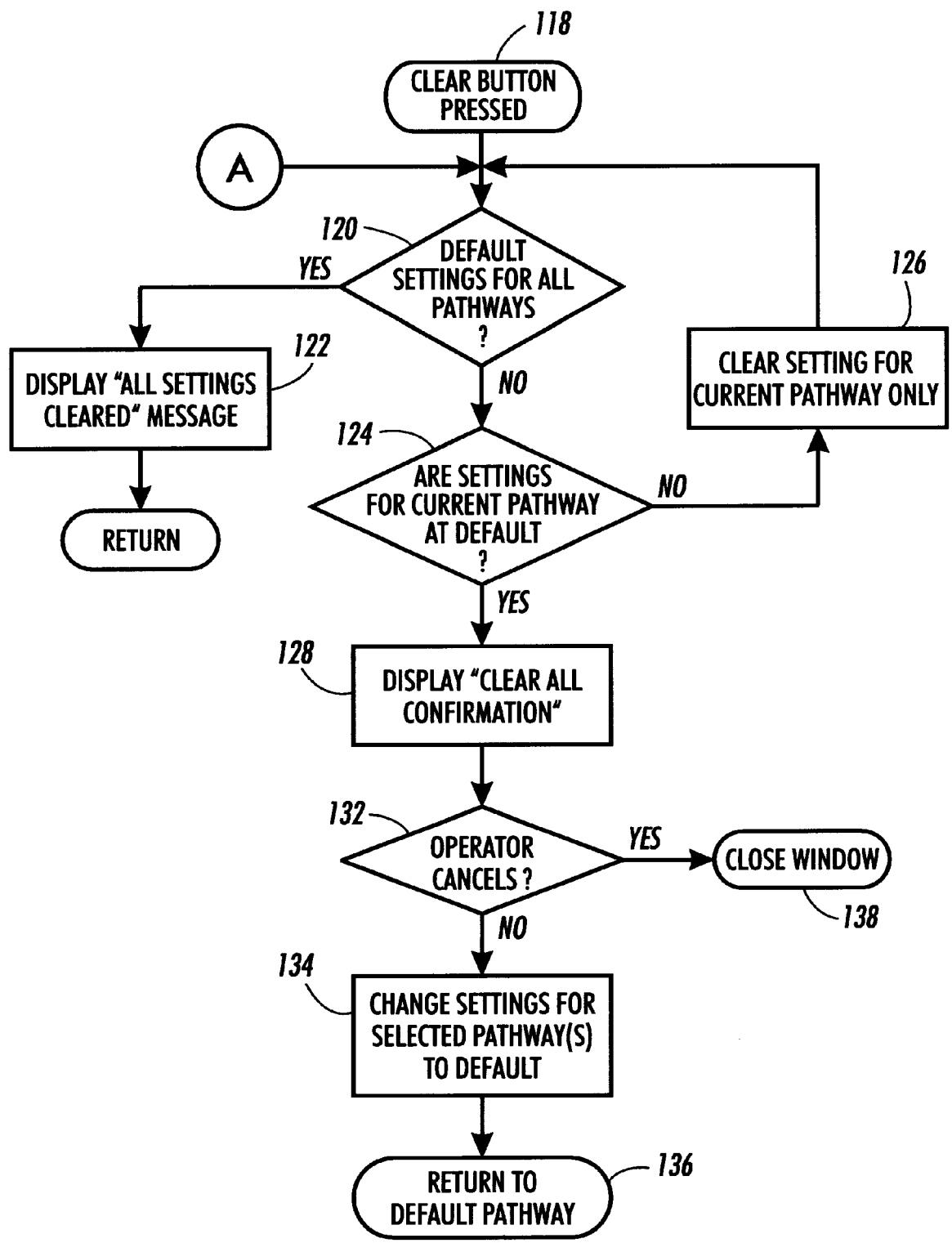
FIG. 9 is flow diagram for illustrating operation of a "clear" button in one preferred mode of operation.
Figure 10:
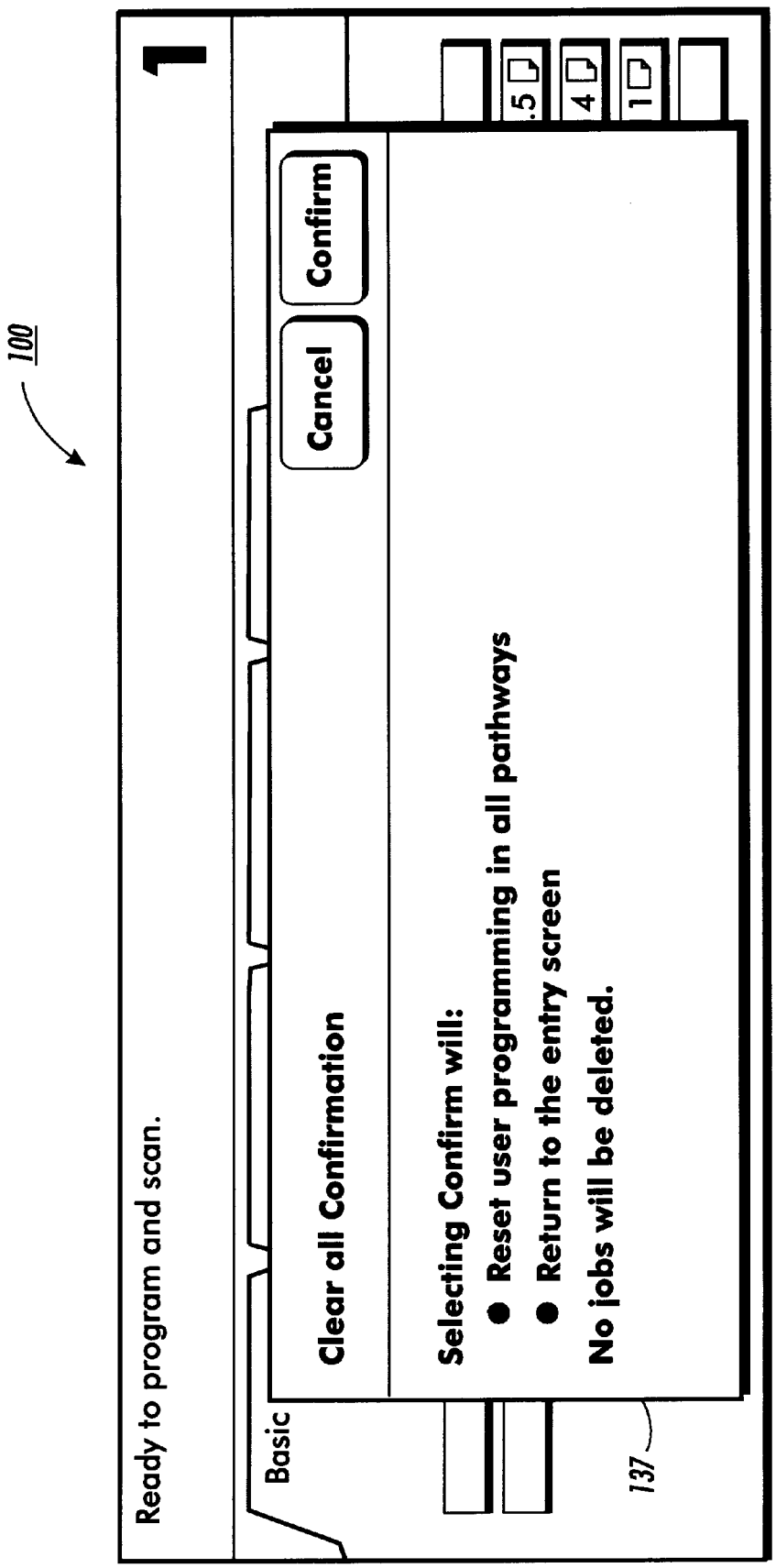
FIG. 10 is a partial, elevational view of the operation panel of FIG. 4 having a first confirmation screen displayed therewith.

Referring now to FIGS. 4, 9 and 10, one embodiment for employing the clear button 104 is described in detail. To appreciate the function of the clear button, as shown in FIG. 9, it is important to understand that the dialogs of a common multifunctional printing system are configured in a default state. In this way, a system user can process a given job, without altering the settings, and obtain an output produced in accordance with the default settings. Typically, however, the system user desires to alter the settings in one or more of the pathways. This alteration of settings can lead to undesirable results for a subsequent user in a "walk-up" multifunctional printing system environment, however, when the subsequent user clears the dialogs in one pathway, but not the dialogs in another pathway.

In the preferred approach of FIG. 9, when the system user presses the clear button 104 (which could be configured as a "hard" or "soft" button) (step 118) a determination is made at step 120 as to whether all of the settings of the pathways are in a default state or configuration. Assuming that all of the settings are in the default state, a message indicating that all settings are already in default is provided by way of step 122. If one of the settings in the pathways is not in the default state, however, then a determination is made at step 124 as to whether the current pathway, namely the pathway enabled through use of the buttons 102, is in a default configuration.

If the current pathway is not at default, then settings for the current pathway are cleared (step 126) and the process loops back to step 120 for the purpose of optionally clearing any other pathways which may not be set at default. Referring to both FIGS. 9 and 10, if (1) one of the pathways is not cleared (negative answer to question 120) and (2) the uncleared pathway is not the current pathway (i.e. the pathway currently displayed) (positive answer to question 124) then a confirmation window 137 is displayed (step 128). As demonstrated by the illustrated embodiment of FIGS. 9 and 10, a system operator can either change settings for one or more pathways (other than the current pathway) by selecting "Confirm" in the confirmation window 137 (steps 132, 134 and 136) or simply close the confirmation window by selecting "Cancel" (steps 132 and 138). In any event, neither operation permitted by the confirmation window will cause image data to be deleted.

Figure 11:
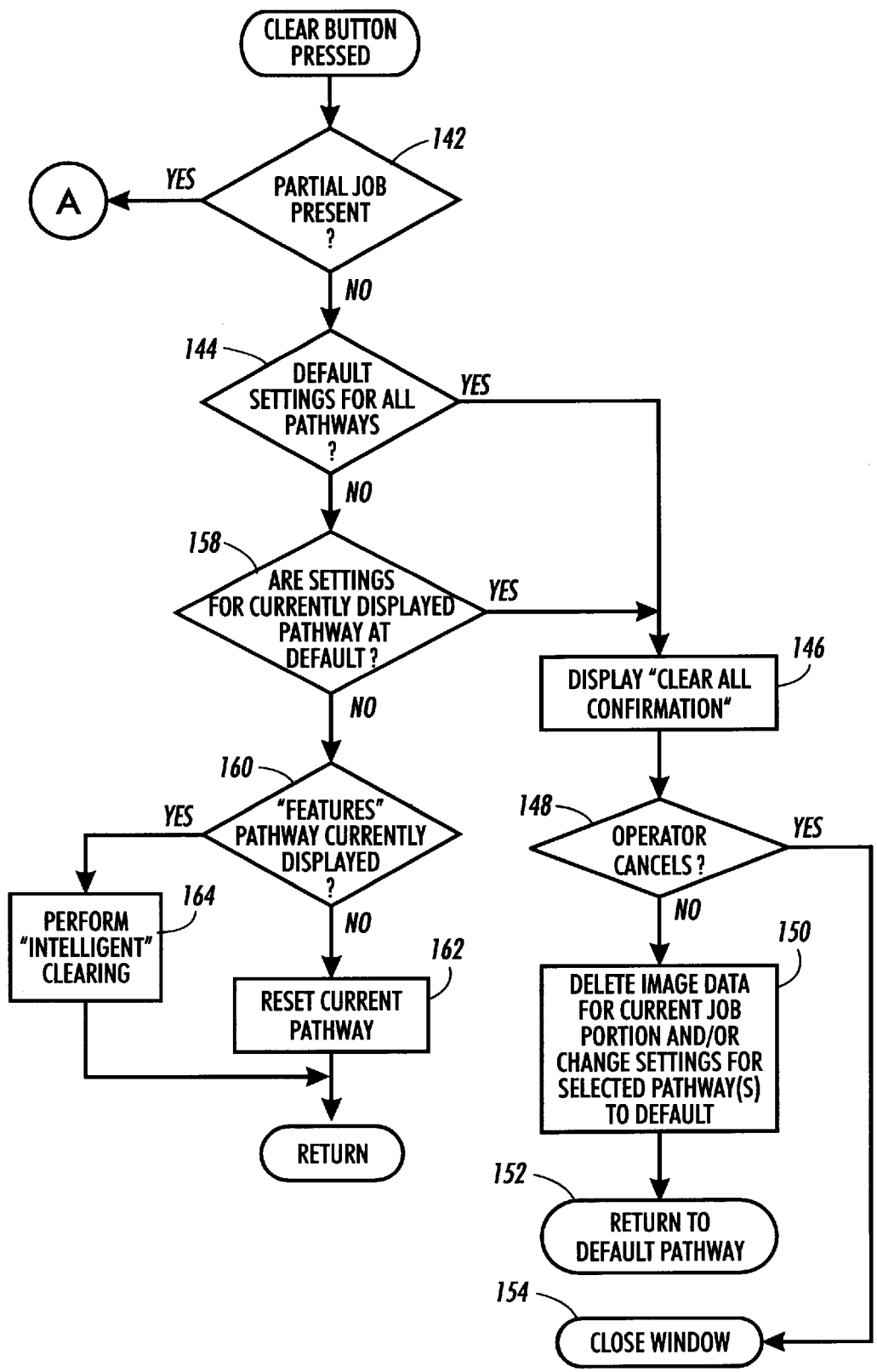
FIG. 11 is flow diagram for illustrating operation of a "clear" button in another preferred mode of operation.

Referring now to FIG. 11, there are certain clearing operations in which deletion of image data may be desirable. In particular, it may be desirable to delete image data for a partial job when the operator seeks to clear settings before completing the corresponding job. In one example, the operator may capture image data corresponding with one side of a simplex-to-duplex or a duplex-to-duplex hardcopy page and then decide to clear the settings for the current pathway. In another example, the operator may provide a job portion, pursuant to creating a "build job", and then seek to clear settings of the current pathway prior to completing such job. To understand the concept of build job in more detail reference is made to the description of U.S. Pat. Nos. 5,081,494 to Reed et al. and 5,579,087 to Salgado, above.

Figure 12:
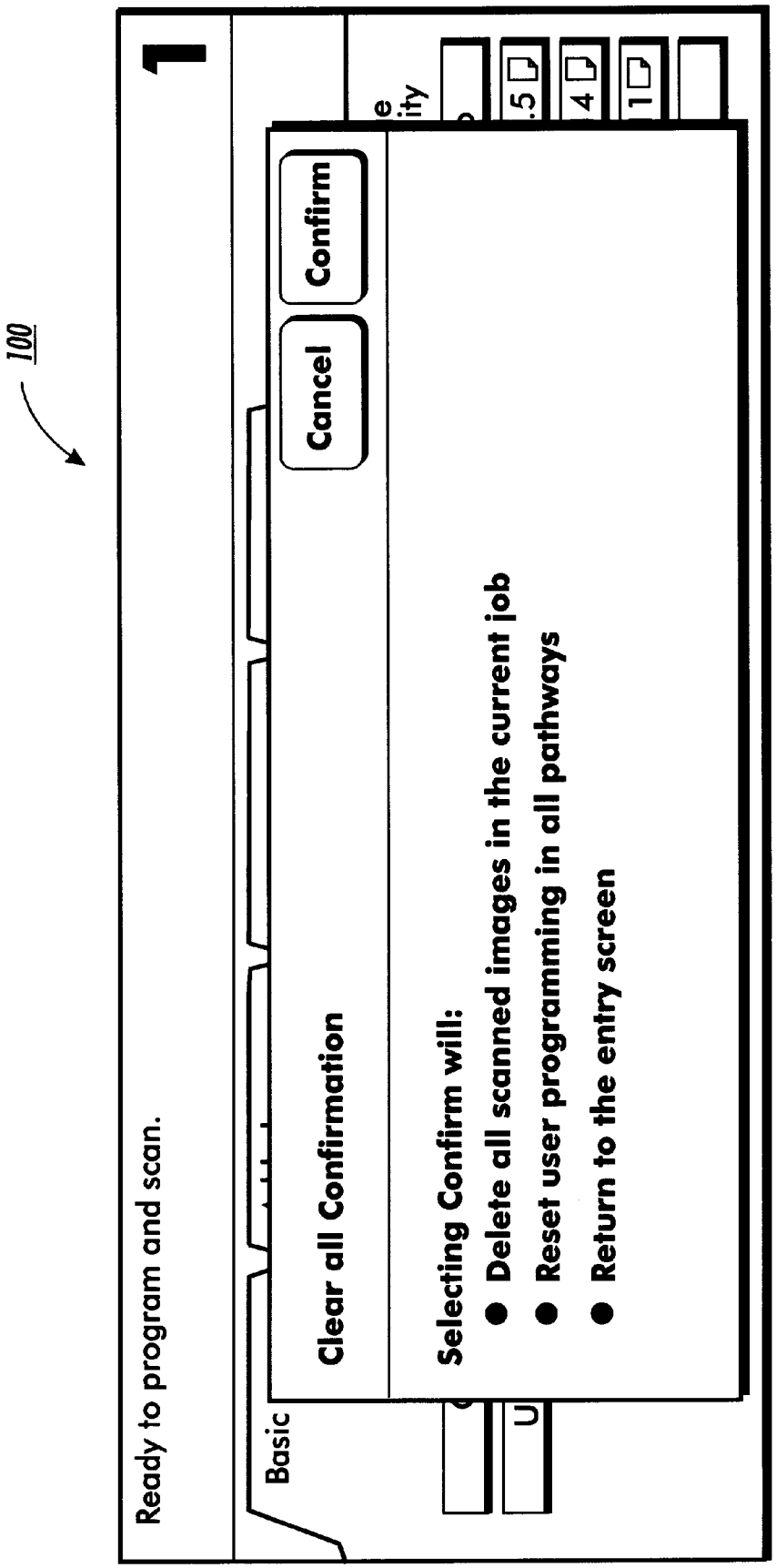
FIG. 12 is a partial, elevational view of the operation panel of FIG. 4 having a second confirmation screen displayed therewith.

Referring now to FIGS. 11 and 12, the behavior of the clear function in the context of pressing the clear button prior to completing the capture or compilation of a job or job portion is described in further detail. For the illustrated embodiment of FIG. 11, pursuant to pressing the clear button, a check is performed at step 142 to determine if image data for a build job or selected job portion (e.g. Simplex-to-Duplex ("1-to-2") or Duplex-to-Duplex ("2-to-2 original")) has been captured. With respect to a given build job, a determination regarding the end of the job can be determined readily since the controller 24 (FIG. 3) can detect when the operator has made a job complete designation with the screen of FIG. 8. Additionally, systems for determining whether two images have been captured for a 1-to-2 or a 2-to-2 original are conventional.

Assuming the answer to the query 142 of FIG. 11 is negative, then a determination is made at step 144 as to whether the settings of all the pathways are in default. Even assuming that all of the pathway settings are in default, the process moves to a subroutine for clearing image data if necessary. It should be recognized that the process is routed to the above-mentioned subroutine of FIG. 9 even when the Features pathway is in default since image capture of a job portion can be incomplete even though the various pathway settings are set to default. The "Clear All Confirmation" screen is displayed at step 146 (See window of FIG. 12) and the operator is provided with an opportunity, at step 148, to cancel any image deletion operation. In response to step 148, either image data is deleted at 150 and a return to the default path is effected (step 152), or the window is simply closed (as a result of the cancel function being enabled) at step 154. As can be appreciated from the present description, a "current job portion" of the type referred to in step 150 could comprise, among other things, a part of an electronic page or a multi-page segment of the type contemplated by a build job process (see FIG. 8).

Returning to step 144, assuming that at least one of the pathway settings is not in default, then a determination is made at step 158 as to whether the currently displayed settings are in default. If the current pathway settings are in default, then the process moves to step 146 where the various steps of the above-described subroutine can be performed, depending on the input of the operator. On the other hand, if the settings for the current pathway are not in default, then a determination is made at step 160 as to whether the currently displayed pathway is the Features pathway. If the currently displayed pathway is not in the Features pathway, then the currently displayed pathway is reset at step 162; otherwise, an "intelligent" clearing operation is performed at step 164. That is, the currently displayed pathway is reset, but build job first segment (referred to above as first "portion") features, and/or features which should not be changed between platen duplex scans are not reset. The respective areas of Signatures and Page Numbering might include features which should not be changed.

Figure 13:
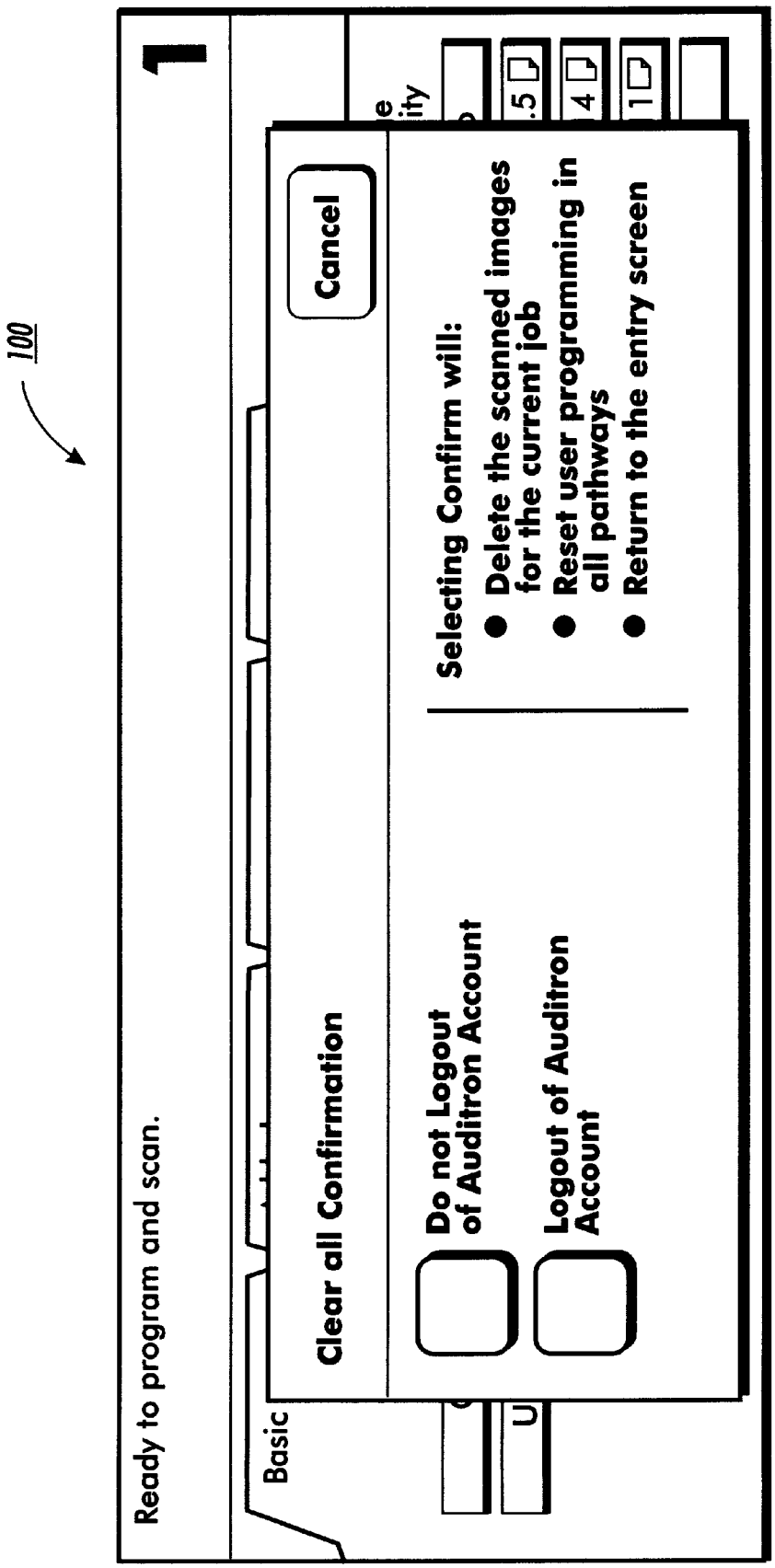
FIG. 13 is a partial, elevational view of the operation panel of FIG. 4 having a third confirmation screen displayed therewith.

As contemplated herein, the printing system 10 is optionally used in conjunction with an auditron service (not shown) installed on the network service module 14. In one approach, the auditron service permits a local or network operator to access one or more services in the printing system (e.g. copy, print and fax services) and, at least in one contemplated mode, guides the operator through a process in which an accounting is made with respect to resources employed. Referring now to FIG. 13, a technique for managing the clear functionality pursuant to use of the auditron is described.

If the auditron is enabled and the operator is accordingly logged in, then the confirmation window of FIG. 13 will be displayed in response to the operator pressing the clear all button. The confirmation window contains the following:

A cancel button in a tool bar which will cancel a clear all request and close the Confirmation window.

A "Do not Logout of Auditron Account" button which, when selected, will reset the Ul (but not log the user out of the auditron account) and will close the window.

A "Logout of Auditron" button which, when selected, will reset the Ul, log the user out of the Auditron account, and close the window.

Two static text regions which correspond to the "Do not Logout of Auditron Account" and "Logout of Auditron" buttons.

A dynamic text area for an explanation of selection options.

Referring specifically to the window of FIG. 13, the following types of explanatory messages are provided to support various contemplated cases of operation:

No image Captured: Enabling either button on the left will, (a) reset user programming in all pathways; and (b) cause a return to an entry screen.

Images Captured: Enabling either button on the left will, (a) delete the scanned images for the current job; (b) reset user programming in all pathways; and (c) cause a return to the entry screen.

Numerous features of the above-described attribute value clearing arrangement will be appreciated by those skilled in the art:

First, in a user interface including multiple pathways, each of which includes multiple dialogs, user settable attribute values can, in accordance with the preferred embodiment, be altered readily to default values (i.e. by simply touching or clicking a clear button twice). As contemplated herein, the first touch or click clears all job programming attribute values, if necessary, and the second touch or click clears all other attribute values.

In a related approach, all of the attribute values could be cleared by a single touch or click. More particularly, when all job programming attribute values are in a default state, then the system automatically clears all other attribute values in response to a single touch or click of the clear button.

Second, the clearing arrangement includes a "safety net" to insure that a user does not clear more attribute values than desired. That is, while one contemplated clearing process uses two clicks or touches for triggering a clear action, the same process will not clear all attribute values until the user has confirmed such clearing with a suitable confirmation screen. In this way the user cannot clear all preprogrammed attribute values by inadvertently touching or clicking the clear button multiple times.

Finally, the clearing arrangement insures that one or more job portions are not left in memory inadvertently when the user decides to abandon execution of such job portion(s). This situation can arise when creating a duplex output or assembling a job from a plurality of job portions. Accordingly, the clearing arrangement prevents unwanted image data from being left in memory.

What is claimed is:

1. In a document processing system for processing a job including image data and a set of attributes, each of which attribute is corresponded with either a default value or a user set value, the document processing system further including a user interface at which a set of default values are settable, in response to user input, to create a set of user set values and a memory for storing at least a part of the image data of the job wherein the at least part of the image data of the job is less than all of the image data of the job, a method for controlling said processing of the job, comprising:

(a) storing the at least part of the image data in the memory;

(b) in response to user input, respectively changing one or more values of the set of user set values to one or more values of the set of default values; and (c) in response to said (b) deleting the at least part of the image data in the memory when a signal is provided by a user of the user interface that confirms the deletion of the at least part.

2. The method of claim 1, further comprising:

(d) creating the at least part of the image data of the job at an image capture device by scanning at least one side of one page of a hardcopy document.

3. The method of claim 2, in which the page of the hardcopy document has a first side and a second side with image information on both of the first and second sides, wherein said (d) includes creating the at least part of the image data of the job by scanning the first side of the hardcopy page prior to (b), and said method further includes performing said (b) after said scanning of the first side of the hardcopy page and prior to any other scanning operation relative to the hardcopy page.

4. The method of claim 2, in which the hardcopy document includes multiple hardcopy pages, wherein said (d) includes creating the at least part of the image data of the job by scanning multiple pages of the hardcopy document prior to performing said (b).

5. The method of claim 1, in which a second set of attributes with corresponding one or more user set values is provided, wherein, in response to said (b), the one or more user set values of the second set of attributes are changed to preselected default values.

6. The method of claim 1, in which the document processing system operates in a first operating mode and a second operating, wherein said (c) includes prohibiting the change of a selected user set value to a default value when the document processing system is disposed in the first mode.

7. The method of claim 1, in which an auditron is used to control accounting in the document processing system and a user can log off from the document processing system by pressing a button operatively associated with the auditron, wherein said (c) includes logging off and confirming that the at least part of the image data is to be deleted.

* * * * *